(12) United States Patent
Combes et al.

(10) Patent No.: US 11,542,022 B2
(45) Date of Patent: Jan. 3, 2023

(54) AIRCRAFT PROPULSION ASSEMBLY

(71) Applicant: Airbus Operations SAS, Toulouse (FR)

(72) Inventors: Stéphane Combes, Buzel sur Tarn (FR); Adeline Soulie, Verdun sur Garonne (FR); Olivier Pautis, Merville (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 279 days.

(21) Appl. No.: 16/615,924

(22) PCT Filed: Dec. 12, 2017

(86) PCT No.: PCT/EP2017/082327
§ 371 (c)(1),
(2) Date: Nov. 22, 2019

(87) PCT Pub. No.: WO2018/233860
PCT Pub. Date: Dec. 27, 2018

(65) Prior Publication Data
US 2020/0207481 A1 Jul. 2, 2020

(30) Foreign Application Priority Data
Jun. 21, 2017 (FR) .................................. 1755661

(51) Int. Cl.
*B64D 27/26* (2006.01)
(52) U.S. Cl.
CPC ........ *B64D 27/26* (2013.01); *B64D 2027/266* (2013.01); *B64D 2027/268* (2013.01)
(58) Field of Classification Search
CPC .............. B64D 27/26; B64D 2027/266; B64D 2027/268; B64D 2027/262
See application file for complete search history.

(56) References Cited

U.S. PATENT DOCUMENTS 8,740,136 B2 * 6/2014 Audart-Noel ....... F16C 11/0695
244/54
8,844,861 B2 9/2014 Balk et al.
(Continued)

FOREIGN PATENT DOCUMENTS

EP 1216921 A1 6/2002
EP 1574429 A2 9/2005
(Continued)

OTHER PUBLICATIONS

Translation of FR-2921341-A1 (Year: 2007).*
International Search Report; priority document.

*Primary Examiner* — Richard R. Green
*Assistant Examiner* — Steven J Shur
(74) *Attorney, Agent, or Firm* — Greer, Burns & Crain, Ltd.

(57) ABSTRACT

A propulsion assembly for an aircraft, comprising a pylon to be secured below a wing of the aircraft and having a front face and a lower face, and a turbomachine comprising, from upstream to downstream in a direction of a flow of air passing through the turbomachine during operation, a fan and an engine driving the fan. The fan is faired by a fan casing and the engine is faired, from upstream to downstream, by an intermediate casing and an engine casing, the intermediate casing having a hub and an outer ring extending the fan casing, the ring being spaced apart radially from the hub and secured to the latter by arms extending in an air duct. The propulsion assembly comprises a front engine attachment secured between the pylon front face and the hub and a rear engine attachment secured between the pylon lower face and the engine casing.

10 Claims, 4 Drawing Sheets

(56) References Cited

U.S. PATENT DOCUMENTS

| | | | |
|---|---|---|---|
| 2004/0094680 A1 | 5/2004 | Brefort et al. | |
| 2005/0269445 A1 | 12/2005 | Chevalier et al. | |
| 2008/0156930 A1 | 7/2008 | Audart-Noel et al. | |
| 2008/0272229 A1* | 11/2008 | Lafont | B64D 27/26 244/54 |
| 2009/0108127 A1 | 4/2009 | Cazals | |
| 2011/0127368 A1 | 6/2011 | Penda et al. | |
| 2014/0061426 A1* | 3/2014 | Zheng | B64D 27/26 248/554 |

FOREIGN PATENT DOCUMENTS

| | | | |
|---|---|---|---|
| EP | 2332835 A2 | 6/2011 | |
| FR | 2878229 A1 | 5/2006 | |
| FR | 2887853 A1 | 1/2007 | |
| FR | 2891243 A1 | 3/2007 | |
| FR | 2921341 A1 * | 3/2009 | B64D 27/26 |
| FR | 2921341 A1 | 3/2009 | |
| WO | 2010007226 A2 | 1/2010 | |

\* cited by examiner

AIRCRAFT PROPULSION ASSEMBLY

CROSS-REFERENCES TO RELATED APPLICATIONS

This application claims the benefit of the International Application No. PCT/EP2017/082327, filed on Dec. 12, 2017, and of the French patent application No. 1755661 filed on Jun. 21, 2017, the entire disclosures of which are incorporated herein by way of reference.

FIELD OF THE INVENTION

The present invention relates to a propulsion assembly for an aircraft, the assembly comprising a pylon, a turbomachine having an engine, a front engine attachment and a rear engine attachment for attaching the engine to the pylon.

BACKGROUND OF THE INVENTION

An aircraft typically comprises a wing beneath which there is secured a pylon, to which there is secured an engine via a system of engine attachments which consists, inter alia, of a front engine attachment at the front and of a rear engine attachment at the rear. The assembly consisting of the pylon and its system of attachments is located radially above the engine, in a clock sector that can be defined as between 10 o'clock and 2 o'clock.

As is known, for example as described in documents EP2332835 and WO2010/007226, the rear engine attachment is reacted by the engine casing, which is also termed the "core-turbine" casing in aeronautical terminology, and the front attachment is reacted by the outer ring of the intermediate casing of the engine, which extends the casing of the fan of the engine.

The invention aims to propose an alternative architecture for the system of engine attachments.

SUMMARY OF THE INVENTION

To that end, the invention relates to a propulsion assembly for an aircraft, the propulsion assembly comprising:
  a pylon intended to be secured below a wing of the aircraft and having a front face and a lower face, and
  a turbomachine comprising, from upstream to downstream in a direction of a flow of air passing through the turbomachine during operation of the latter, a fan and an engine driving the fan, the fan being faired by a fan casing and the engine being faired, from upstream to downstream, by an intermediate casing and an engine casing, the intermediate casing having a hub and an outer ring extending the fan casing, the ring being spaced apart radially from the hub and secured to the latter by arms extending in an air duct,
  the propulsion assembly comprising a front engine attachment secured between the front face of the pylon and the hub and a rear engine attachment secured between the lower face of the pylon and the engine casing.

BRIEF DESCRIPTION OF THE DRAWINGS

The abovementioned features of the invention, along with others, will become more clearly apparent on reading the following description of one exemplary embodiment, the description being given with reference to the appended drawings, in which.

DETAILED DESCRIPTION OF THE PREFERRED EMBODIMENTS

Figure 1:
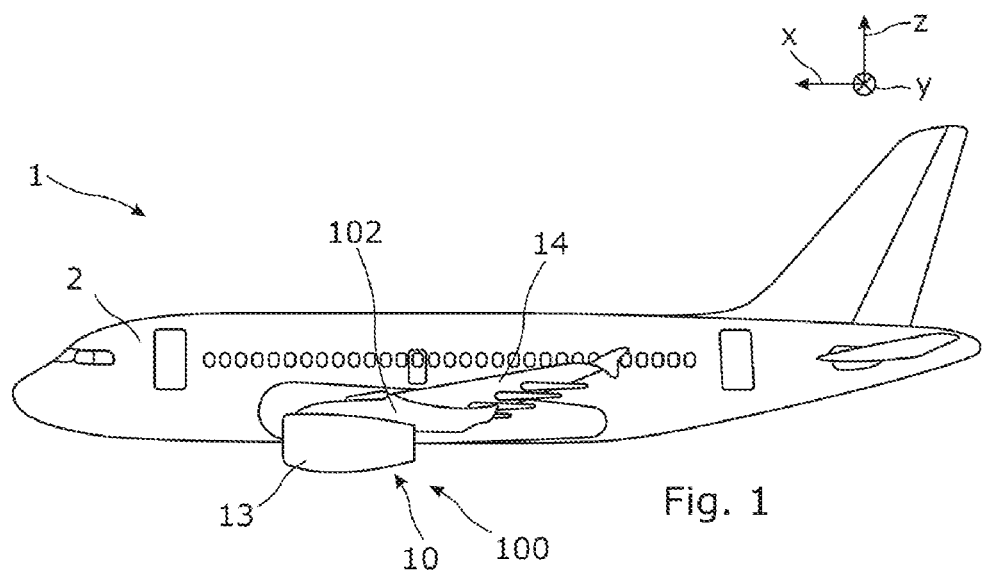
FIG. 1 is a side view of an aircraft having a propulsion assembly according to the invention.
Figure 2:
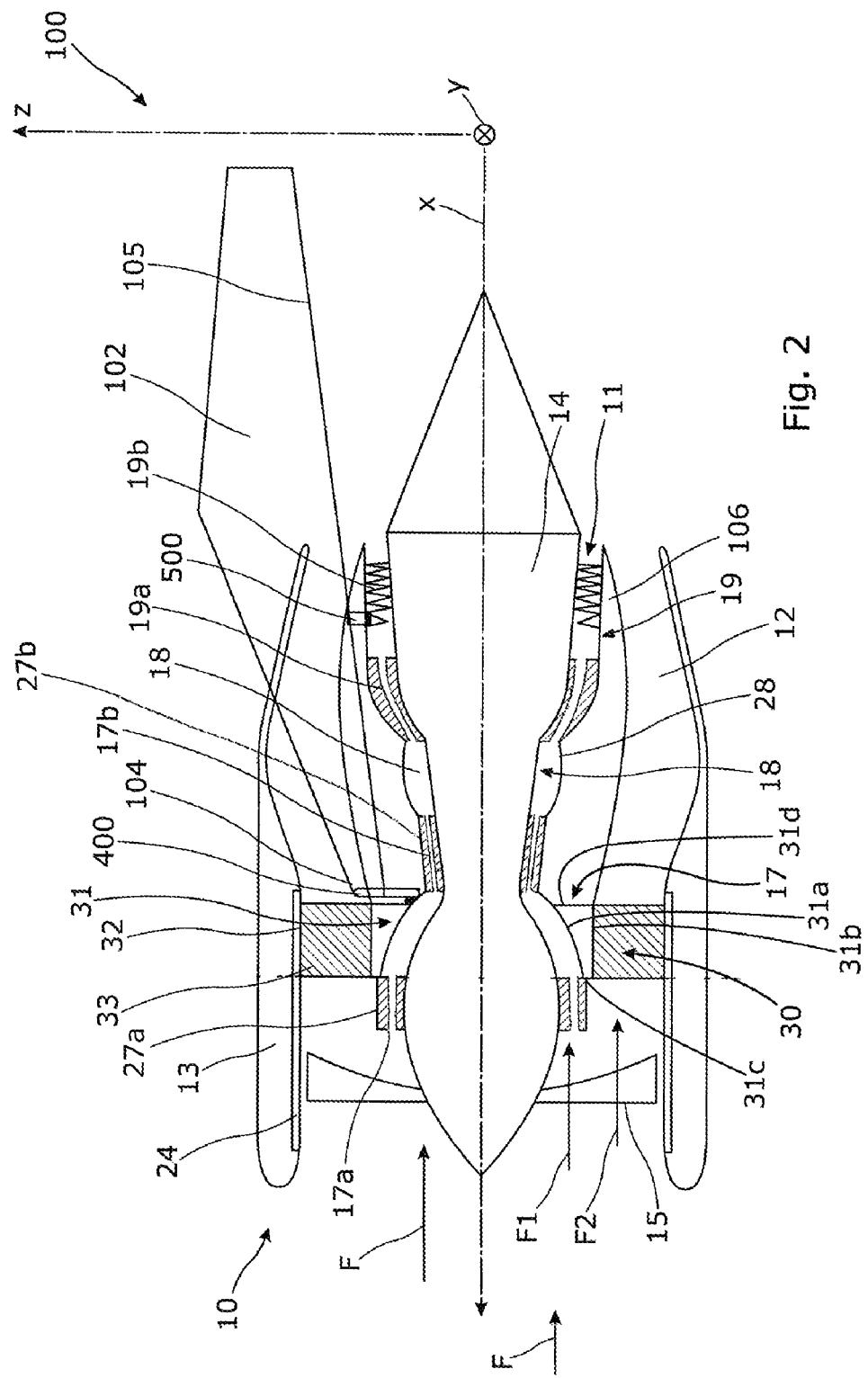
FIG. 2 is a side view of a turbomachine of the propulsion assembly shown in FIG. 1, according to one embodiment of the invention.

With respect to FIGS. 1 and 2, an aircraft 1 comprises a fuselage 2 to which are attached two wings 4, on either side of the fuselage 2. Beneath each wing 4 there is secured at least one propulsion assembly 100 which comprises a pylon 102 secured beneath the wing 4 and a two-flow turbomachine 10 comprising a cylindrical nacelle 13 which surrounds an engine 14 secured to the pylon and a fan 15 driven by the engine 14.

The pylon 102 has a front face 104 which is generally perpendicular to the longitudinal axis X of the turbomachine 10 and is oriented towards the front of the aircraft 1, and a lower face 105 which is generally horizontal (that is to say, in the direction of the longitudinal axis X) and faces the ground.

During operation of the turbomachine 10, a mass of air is drawn in, then expelled by the fan 15. The mass of air is divided, from upstream to downstream in the direction of a flow of air F passing through the turbomachine 10 and essentially parallel to the longitudinal axis X, into a primary flow F1 which flows in a primary air duct 11, and a secondary flow F2 which is concentric with the primary flow F1 and flows in a secondary air duct 12, or fan duct. The two ducts are separated by an inter-duct element 106.

The primary flow F1 passes through, from upstream to downstream, the various elements of the engine 14, specifically a stage of compressors 17, comprising, for example, a low-pressure compressor 17a and a high-pressure compressor 17b downstream of the low-pressure compressor, a combustion chamber 18, a stage of turbines 19, comprising, for example, a high-pressure turbine 19a and a low-pressure turbine 19b downstream of the high-pressure turbine.

Structural casings are mounted around the elements of the turbomachine and serve to stiffen the latter in order, in particular, to limit distortions thereof during operation.

Thus, the fan 15 is faired by a fan casing 24 and the elements of the engine 14 are surrounded, from upstream to downstream, by a low-pressure compressor casing 27a which surrounds the low-pressure compressor 17a, a high-pressure compressor casing 27b which surrounds the high-pressure compressor 17b, then an engine casing 28, referred to as the "core-turbine" casing in aeronautical jargon, which surrounds the combustion chamber 18 and the high-pressure and low-pressure turbines 19a,b.

The turbomachine 10 further comprises an intermediate casing 30 having a part forming a hub 31 and a cylindrical outer ring 32 radially spaced apart from the hub by the secondary duct 12 and secured to the hub by means of arms 33. The hub 31 is, in part, arranged between the low-pressure compressor casing 27a and the high-pressure compressor casing 27b.

The hub 31 comprises two coaxial annular rings, respectively an inner ring 31a and an intermediate ring 31b, defining a space closed in the upstream direction by an upstream transverse flange 31c which connects the inner ring 31a and intermediate ring 31b, and closed in the downstream direction by a downstream transverse flange 31d which connects the inner ring 31a and intermediate ring 31b.

The outer ring 32 is located downstream and in the continuation of the fan casing 24 and extends the latter so as to form the outer boundary of the secondary air duct 12 whereas the intermediate ring 31b forms the inner boundary of the secondary air duct 12. The inner ring 31a, for its part, forms the outer boundary of the primary air duct 11. The inter-duct element 106 extends the hub 31.

Figure 4:
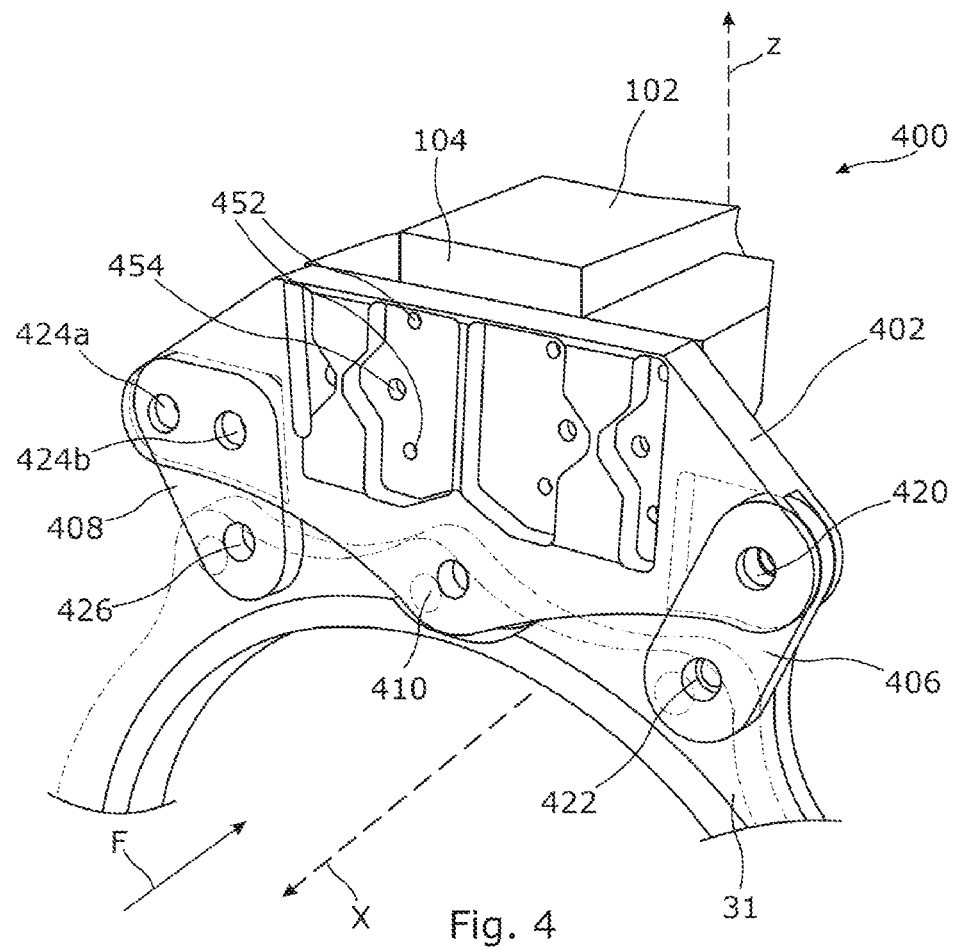
FIG. 4 is a perspective view of a front engine attachment of the propulsion assembly according to the invention.
Figure 3:
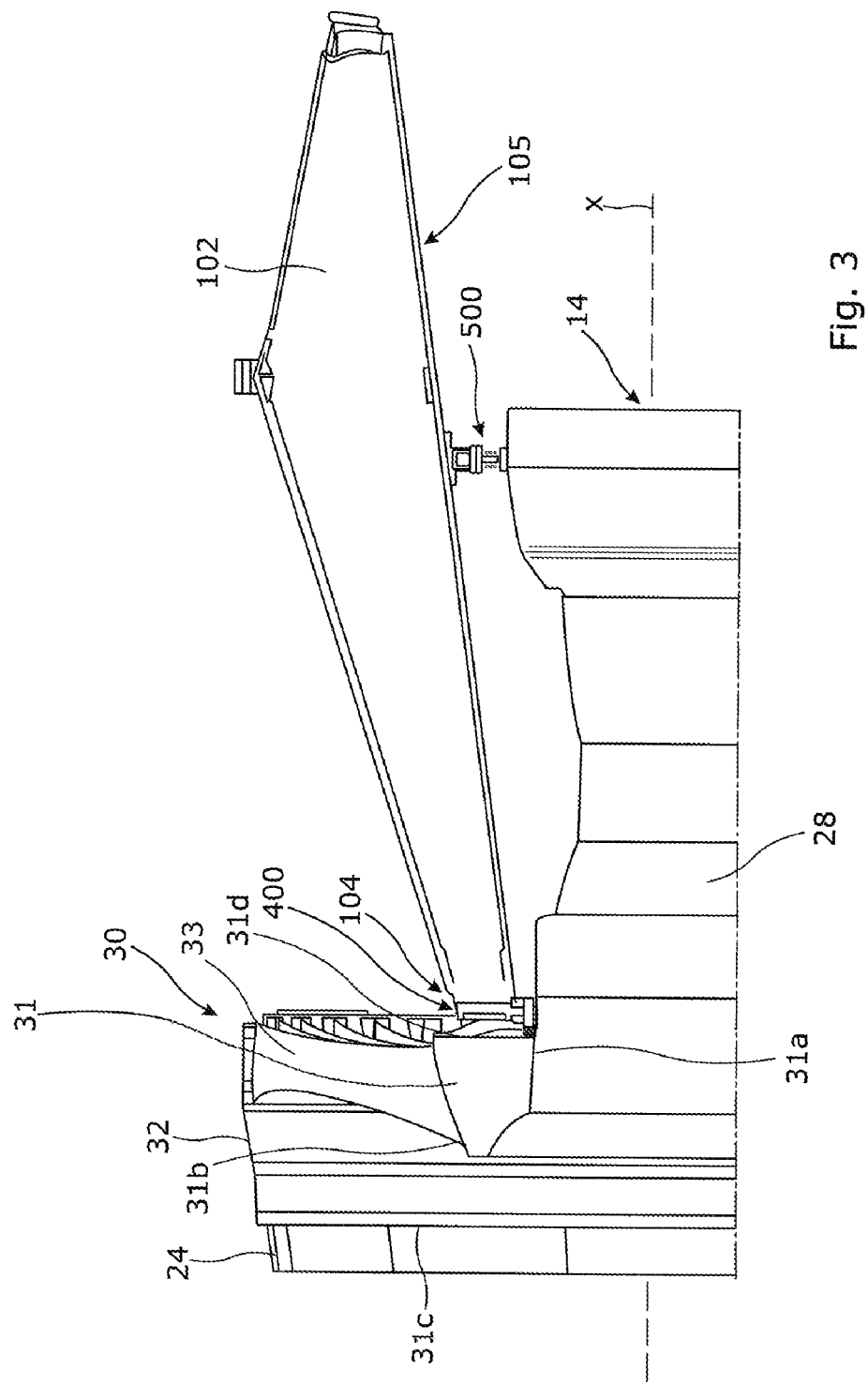
FIG. 3 is a side view of the pylon and of the engine of the turbomachine of the propulsion assembly shown in FIG. 2, according to one embodiment of the invention.
Figure 5:
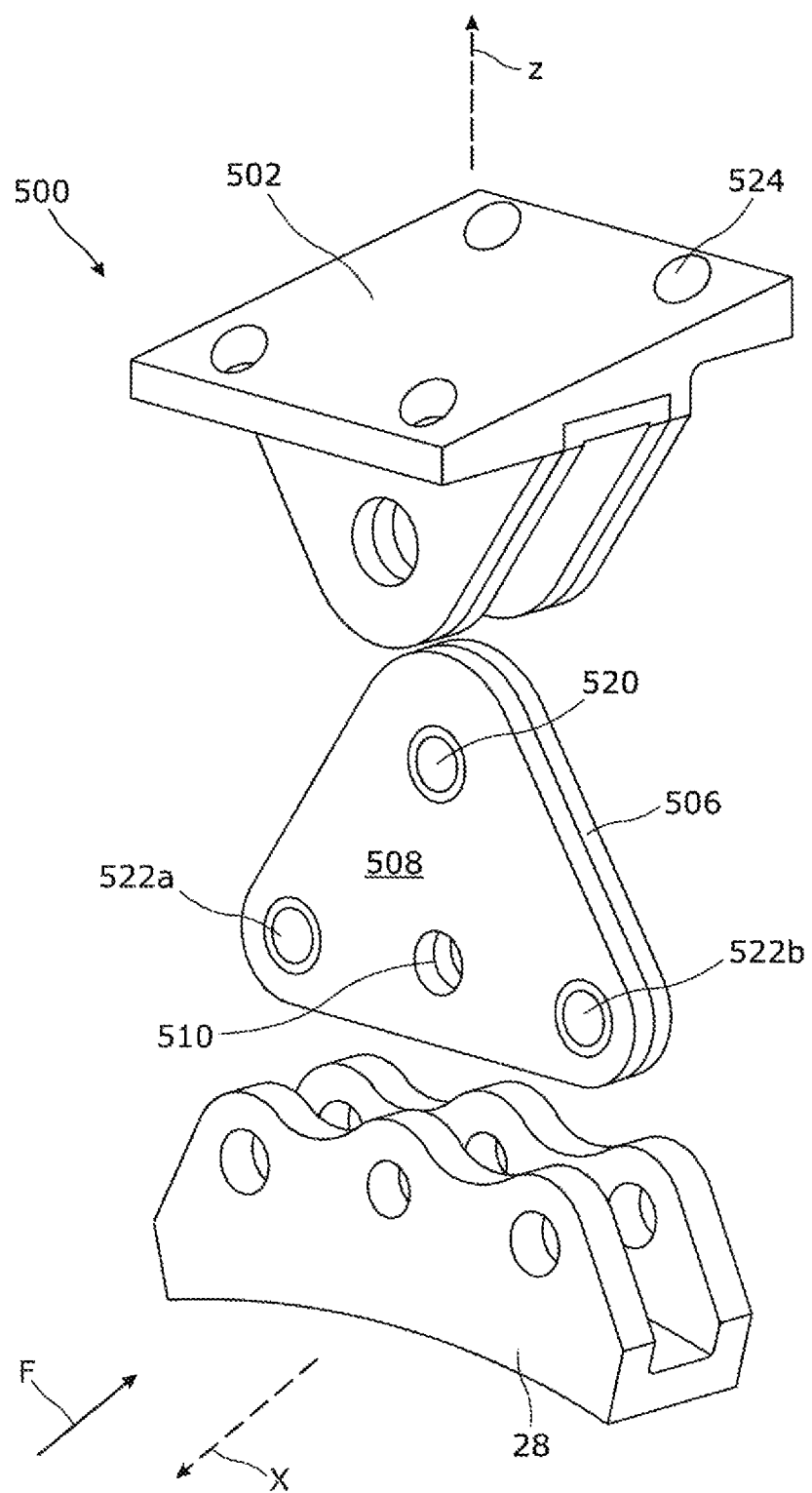
FIG. 5 is an exploded perspective view of a rear engine attachment of the propulsion assembly according to the invention.

In relation to FIGS. 3 to 5 (FIG. 3 shows only the structural casings and not the constituent parts of the engine), the engine 14 is secured to the pylon 102, inter alia, at the front by a front engine attachment 400 and at the rear by a rear engine attachment 500.

According to the invention, the front engine attachment 400 is secured between the pylon 102 and the hub 31 of the intermediate casing 30, and the rear engine attachment 500 is secured between the pylon 102 and the engine casing 28.

The front engine attachment 400 is secured either to the downstream transverse flange 31d (as shown in FIG. 3) or to the inner ring 31a (as shown in FIG. 2) of the hub.

The front engine attachment 400 comprises:
a beam 402 which is secured to the front face 104 of the pylon 102,
a first lateral connecting rod 406 secured at a connection point 420 to the beam 402 and at a connection point 422 to the hub 31 of the intermediate casing, for example to the downstream transverse flange 31d (in the example of FIG. 3) or to the inner ring 31a (in the example of FIG. 2), and
a second lateral connecting rod 408 secured at two connection points 424a-b to the beam 402 and at a connection point 426 to the hub 31 of the intermediate casing, for example to the downstream transverse flange 31d (in the example of FIG. 3) or to the inner ring 31a (in the example of FIG. 2).

In FIG. 4, the part of the hub 31 which is upstream of the front engine attachment 400 is depicted as transparent and by means of dash-dotted lines for reasons of clarity; each connecting rod 406, 408 is drawn in solid lines despite certain parts being hidden.

For each lateral connecting rod 406, 408, each point of connection to the beam 402 and to the hub 31 comprises a clevis created, respectively in the beam 402 and the hub 31, by a bore passing through the lateral connecting rod 406, 408 and by a single shear pin which passes through the clevis and fits into the bore of the connecting rod via a ball joint.

The frontal position of the beam 402 on the pylon 102 makes it possible to integrate the beam 402 into the hub 31 of the propulsion assembly 100. The beam 402 then constitutes a front rib of the pylon 102 and promotes compact integration while reducing the vertical (in the Z direction) and longitudinal (in the X direction) bulk of the front engine attachment 400 in comparison to the prior art engine attachments which are secured to the outer ring of the intermediate casing.

The front engine attachment 400 and its particular installation between the pylon 102 and the hub 31 make it possible to react forces in the Y and Z directions, and to react the moment Mx (torsion about the longitudinal axis X) through the two ball jointed connecting rods 406 and 408. Moreover, the front engine attachment 400 allows the engine 14 to move in the X direction relative to the pylon 102, by virtue of the ball joints installed at the points of connection of the connecting rods 406 and 408.

Thus, the load path is more direct than in a prior art installation since the front engine attachment according to the invention reacts only forces contained in the plane of the attachment itself, that is to say, vertical forces (in the Z direction), transverse forces (in the Y direction), and the moment Mx.

For better safety, the front engine attachment 400 comprises an additional connection point 410 between the beam 402 and the hub 31. This additional connection point 410 takes the form of a backup safety securing point (or "fail-safe") which provides an alternative load path to compensate for failure of one or more of the connecting rods 406 and 408. Thus, the front engine attachment 400 includes the main load paths, which are loaded during "nominal" use, and the secondary or "fail-safe" load paths, which are loaded in the event that the main path is in "faulty" or "broken" use.

This additional connection point 410 comprises, for example, a clevis created in the hub 31 (for example in the downstream transverse flange 31d) and a pin fitted into the clevis, the pin passing through a bore of the beam 402, whose diameter is greater than the diameter of the pin. Thus, in normal operation there is no contact between the pin and the beam 402, and in the event of failure of one of the connecting rods 406 and 408 the hub 31 will move and the pin will then come into contact with the beam 402.

The beam 402 is secured to the pylon 102 preferably by means of two securing assemblies distributed on either side of a longitudinal plane of symmetry of the pylon 102 and each comprising two tension bolts 452 and one peg 454, where one tension bolt 452 is arranged in the upper part of the beam 402, one tension bolt 452 is arranged in the lower part of the beam 402 and the peg 454 is arranged between the tension bolts 452.

With reference to FIG. 5, the rear engine attachment 500 comprises:
a fitting 502 which is secured to the lower face 105 of the pylon 102,
a downstream connecting rod 506 secured at a connection point 520 to the fitting 502 and at two connection points 522a-b to the engine casing 28, and
an upstream connecting rod 508 secured at a connection point 520 to the fitting 502 and at two connection points 522a-b to the engine casing 28.

Thus, each connecting rod 506, 508 has three connection points.

For each connecting rod 506, 508, the point of connection 520 to the fitting 502 consists of a clevis created, in the fitting 502, by a bore passing through each connecting rod 506, 508 and by a double shear pin which passes through the clevis and fits into the bores of the connecting rods 506 and 508 via a ball joint. The double pin comprises two pins, one fitted inside the other: a solid inner pin inserted with a clearance fit inside a hollow outer pin. In the event of failure of the outer pin, the forces are reacted by the remaining inner pin.

For each connecting rod 506, 508, each point of connection 522a-b to the engine casing 28 comprises a clevis created, in the engine casing 28, by a bore passing through each connecting rod 506, 508 and by a solid single shear pin which passes through the clevis and fits into the bores via a ball joint. The pins and the bores have a tight fit, also referred to as engaged mounting.

Thus, each connecting rod 506, 508 has one bore per connection point, that is to say, in this case three bores. The two connecting rods 506 and 508 are pressed against one another, each bore of the downstream connecting rod 506 being aligned with a bore of the upstream connecting rod 508.

The rear engine attachment 500 serves to react forces in the Y and Z directions by means of the two ball-jointed connecting rods 506 and 508. Moreover, the rear engine attachment 500 allows the engine 14 to move in the X direction relative to the pylon 102, by virtue of the ball joints installed at the points of connection of the connecting rods 506 and 508. The fact that the moment Mx is not reacted makes it possible to reduce the bulk, in particular in the Y direction, of the rear engine attachment 500, in comparison with that of the prior art, and thus to limit the width of the aerodynamic shapes around this attachment, which in turn serves to improve the aerodynamic performance of the aircraft 1.

For better safety, the rear engine attachment 500 comprises an additional connection point 510 between the connecting rods 506 and 508 and the engine casing 28. This additional connection point 510 takes the form of a backup safety securing point (or "fail-safe") which will compensate for failure of an element of the rear engine attachment 500.

This additional connection point 510 comprises, for example, a clevis created in the engine casing 28 and a pin which is fitted into the clevis and which passes through a bore shared by both connecting rods 506 and 508, whose diameter is greater than the diameter of the pin. Thus, in normal operation there is no contact between the pin and the connecting rods 506 and 508, and in the event of a problem the structural casing 260 will move and the pin will then come into contact with the connecting rods 506 and 508.

The fitting 502 is secured to the pylon 102 preferably by means of four tension bolts through bores 524 provided to that end in the fitting 502.

Ball-jointing of the connecting rods on the pins is brought about, for example, by installing a sphere on the pin and by the fact that the connecting rod can slide around this sphere.

In order to react the thrust forces in the X direction, the propulsion assembly 100 preferably comprises two connecting rods secured between the pylon 102 and the structural casing 560, the connecting rods being arranged on either side of the plane of symmetry of the pylon 102.

It will be noted that, contrary to the prior art engine attachments in which the rear engine attachment is reacted by the engine casing and the front engine attachment is reacted by the outer ring of the intermediate casing, the invention is advantageous in terms of mass and reaction of forces.

Indeed, the front and rear engine attachments 400, 500 according to the invention are close together both axially (X direction) and radially (Z direction), which thus implies a shorter chain of dimensions (fewer parts through which the reaction forces pass), which reduces deformation and distortion of the structural frame of the engine 14 during operation. This improves the performance of the engine 14 since the latter can then be designed with reduced tolerances, in particular with respect to the turbine and compressor elements, where the clearances between the blade/vane tips of these elements and the blade/vane casings can be reduced. Moreover, the torsion moment Mx at the front engine attachment 400 is reacted closer to the axis of the engine (shorter lever arm) than is the case in prior art front engine attachments, and therefore has a lower absolute value. This means that, in the invention, it is not necessary to add an additional structure of the engine cradle type in order to stiffen the engine 14.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, comprising:
a pylon extending along a longitudinal axis and configured to be secured below a wing of the aircraft and having a front face which is generally perpendicular to the longitudinal axis and oriented towards the front of the aircraft and a lower face, and
a turbomachine comprising, from upstream to downstream in a direction of a flow of air passing through the turbomachine during operation of the turbomachine, a fan and an engine driving the fan, the fan being faired by a fan casing and the engine being faired, from upstream to downstream, by an intermediate casing and an engine casing, the intermediate casing having a hub and an outer ring extending the fan casing, said ring being spaced apart radially from the hub and secured to the hub by arms extending in an air duct,
a front engine attachment secured between the front face of the pylon and the hub and a rear engine attachment secured between the lower face of the pylon and the engine casing,
wherein the front engine attachment comprises:
a beam which is secured to the front face of the pylon and generally aligned with the hub in a direction parallel to the longitudinal axis and above the hub, wherein the beam constitutes a front rib of the front face of the pylon,
a first lateral connecting rod transverse to the longitudinal axis and secured at a connection point to the beam and at a connection point to the hub, and
a second lateral connecting rod transverse to the longitudinal axis and secured at two connection points to the beam and at a connection point to the hub.

2. The propulsion assembly according to claim 1, wherein, for each lateral connecting rod, each point of connection to the beam and to the hub comprises a clevis created, respectively in the beam and the hub, by a bore passing through the lateral connecting rod and by a single shear pin passing through the clevis and fitting into the bore via a ball joint.

3. The propulsion assembly according to claim 1, wherein the front engine attachment comprises an additional connection point between the beam and the hub, and wherein the additional connection point forms a backup safety securing point.

4. The propulsion assembly according to claim 3, wherein the additional connection point comprises a clevis created in the hub and a pin fitted into said clevis, said pin passing through a bore of the beam, whose diameter is greater than a diameter of the pin.

5. The propulsion assembly according to claim 1, wherein the beam is secured to the pylon by means of two securing assemblies distributed on either side of a longitudinal plane of symmetry of the pylon, wherein each securing assembly comprises two tension bolts and one peg, and wherein one tension bolt is arranged in an upper part of the beam, one tension bolt is arranged in a lower part of the beam and the peg is arranged between the tension bolts.

6. The propulsion assembly according to claim 1, wherein the rear engine attachment comprises:
   a fitting which is secured to the lower face of the pylon,
   a downstream connecting rod secured at a connection point to the fitting and at two connection points to the engine casing, and
   an upstream connecting rod secured at a connection point to the fitting and at two connection points to the engine casing.

7. The propulsion assembly according to claim 6, wherein for each connecting rod, a point of connection to the fitting comprises a clevis created, in the fitting, by a bore passing through each connecting rod and by a double shear pin which passes through the clevis and fits into the bores of the connecting rods via a ball joint, and wherein, for each connecting rod, each point of connection to the engine casing comprises a clevis created, in the engine casing, by a bore passing through each connecting rod and by a single shear pin passing through the clevis and fitting into the bores via a ball joint.

8. The propulsion assembly according to claim 6, wherein the rear engine attachment comprises an additional connection point between the connecting rods and the engine casing, and wherein the additional connection point forms a backup safety securing point.

9. The propulsion assembly according to claim 8, wherein the additional connection point comprises a clevis created in the engine casing and a pin which is fitted into said clevis, said pin passing through a bore shared by both connecting rods, whose diameter is greater than a diameter of the pin.

10. An aircraft comprising at least one propulsion assembly according to claim 1.

* * * * *